UNITED STATES PATENT OFFICE.

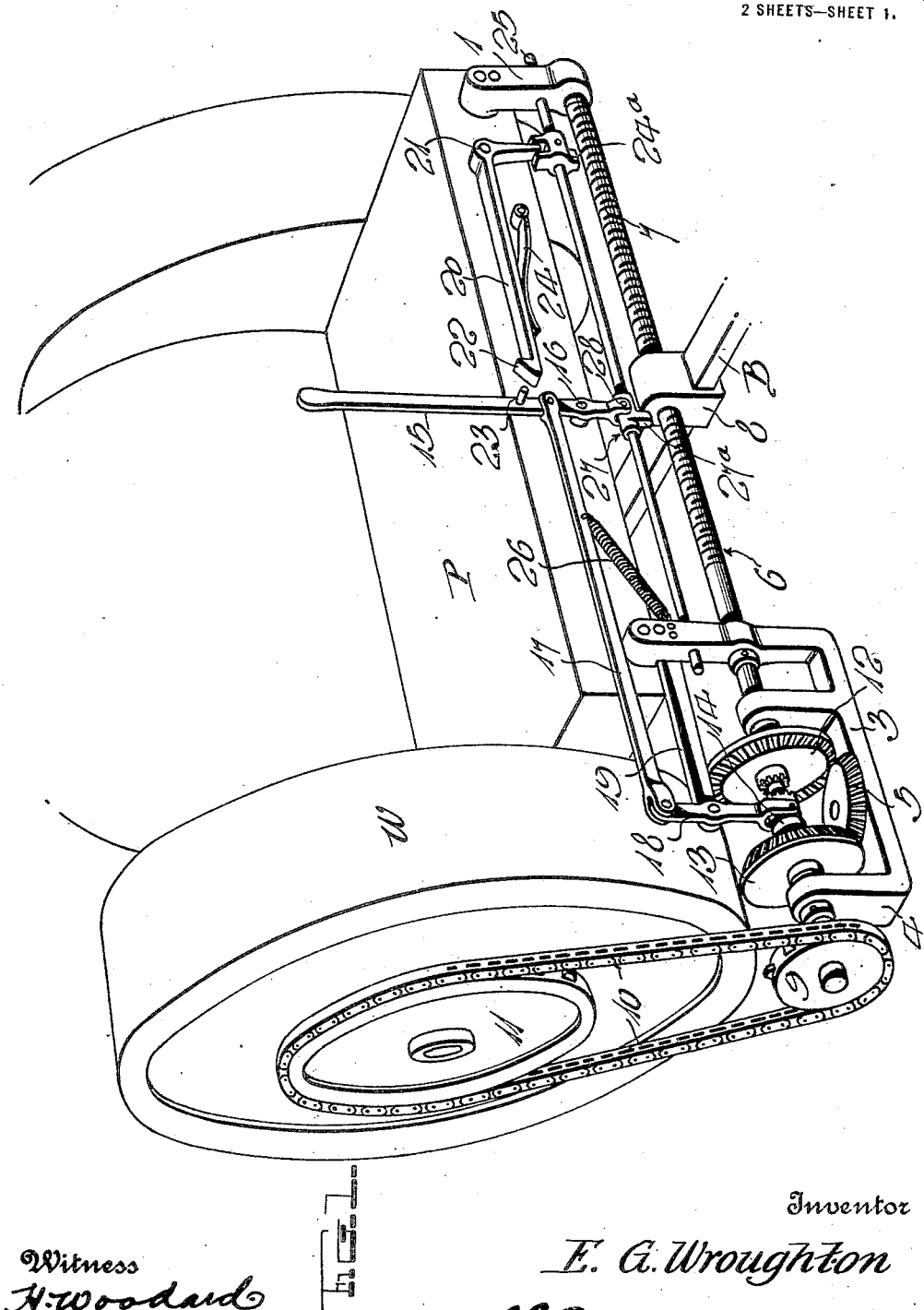
E. G. WROUGHTON.
ATTACHMENT FOR TRACTORS.
APPLICATION FILED JUNE 30, 1921.
1,420,174.
Patented June 20, 1922.
2 SHEETS—SHEET 1.
Witness
H. Woodard
Inventor
E. G. Wroughton
By H. B. Willson &co
Attorneys

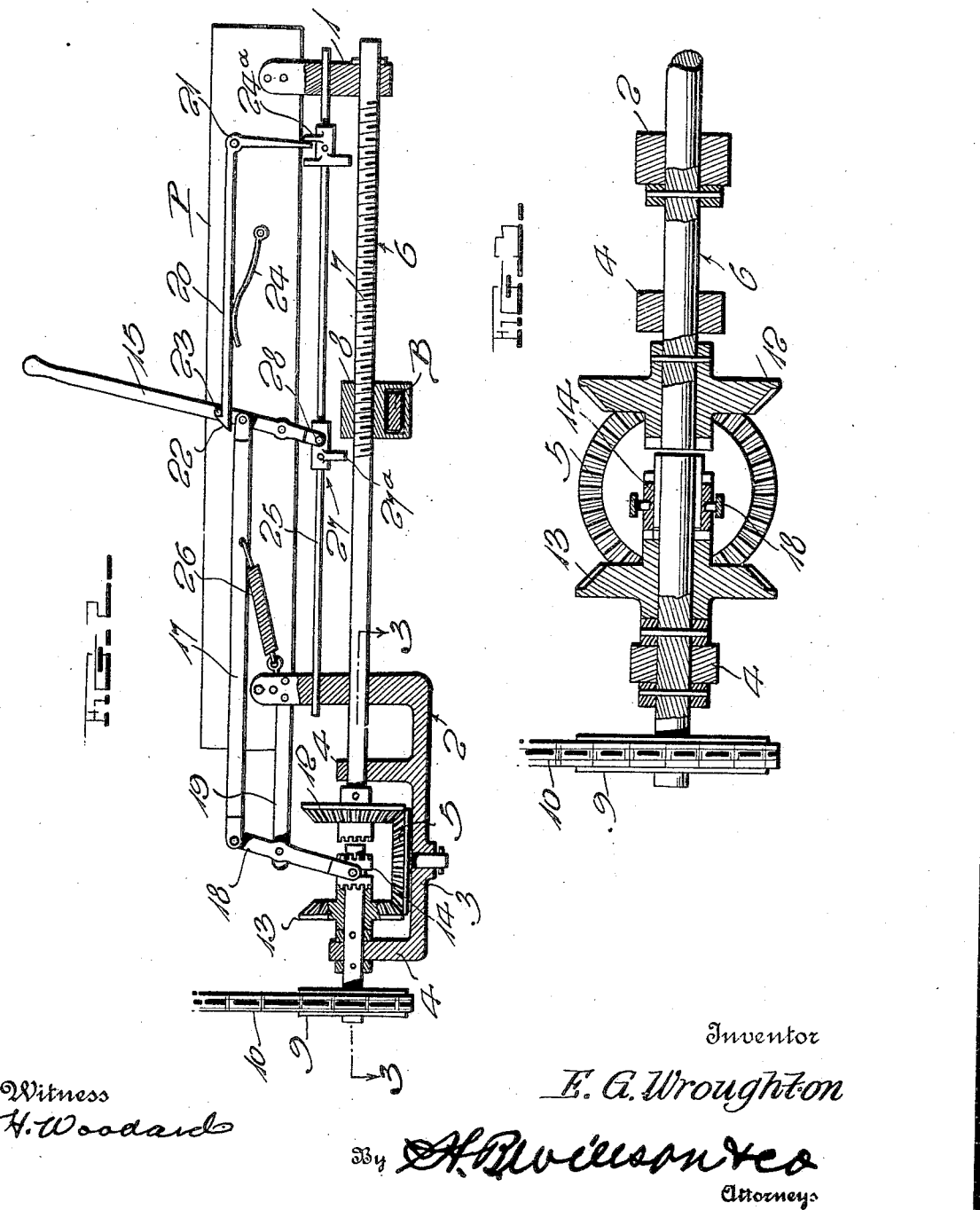

ERNEST G. WROUGHTON, OF NELSON, NEBRASKA.

ATTACHMENT FOR TRACTORS.

1,420,174.

Specification of Letters Patent.   Patented June 20, 1922.

Application filed June 30, 1921.   Serial No. 481,573.

*To all whom it may concern:*

Be it known that I, ERNEST G. WROUGHTON, a citizen of the United States, residing at Nelson, in the county of Nuckolls and State of Nebraska, have invented certain new and useful Improvements in Attachments for Tractors; and I do declare the following to be a full, clear, and exact description of the invention, such as will enable others skilled in the art to which it appertains to make and use the same.

This invention relates to an improved attachment for tractors and the like, the same being especially designed to be associated with the draw-bar, with which such machines are usually equipped, to automatically move the draw-bar horizontally across the rear end of the tractor when the latter is making a turn at the end of the field to travel in an opposite direction, the improved attachment being such that it causes the trailer vehicle to accurately follow in the tracks of the tractor or lead vehicle.

The principal object of the invention is to generally improve upon devices of this class by the provision of one of extreme simplicity and durability embodying extremely few simple and inexpensive parts which are so arranged as to not easily get out of working order, the construction and arrangement being such that the device is rendered extremely practical and effectively accomplishes the desired ends.

Another and very important object of the invention is to provide an attachment of the above class which embodies a feed screw for disposition at the rear end of the tractor, the draw-bar or other hitching device being connected to and movable along the screw and when reaching a predetermined point, actuating certain mechanism which in turn actuates a clutch to change the direction of rotation of the screw and automatically reverse the direction of movement of the hitching device.

Another object of the invention is to provide an attachment of this class embodying the aforesaid construction together with means for co-operation with the hitching device so that when the latter on its return to the center of the screw will engage such means and return the clutch operating lever to neutral position.

Other objects and advantages of the invention will be apparent during the course of the following description.

In the accompanying drawings forming a part of this specification and in which like numerals are employed to designate like parts throughout the same:

Figure 1 is a perspective view of the rear end of a tractor equipped with a draw-bar shifting attachment constructed in accordance with this invention, the parts of said attachment being shown in their normal inoperative position.

Figure 2 is a rear end elevational view, with parts of the various details broken away and shown in section, the clutch operating lever being held in one of its operative positions.

Figure 3 is an enlarged detail sectional view taken substantially on the plane of the line 3—3 of Fig. 2.

Briefly described, the improved draw-bar shifting attachment comprises a feed-screw adapted to be rotatably mounted on the rear end of the platform of a tractor or other suitable pulling machine. Connected to this screw through the medium of a travelling block is the draw-bar or other hitching means with which the tractor is usually equipped. Gearing is loosely mounted on the screw and means is associated with this gearing for rotating it in either of two directions, a clutch being employed for coupling the desired gear to the screw for rotation with the latter, and this clutch is operated by a hand actuated lever which is connected thereto through the medium of suitable linkage. As before indicated, novel means in the form of a trip serves to retain the hand lever in one of its operative positions and this trip is released when the hitching device engages it, this causing a reverse rotation of the screw and causing the hitching device to return to its normal central position on the screw or shaft as it may also be termed.

Referring to the drawings, wherein the construction and arrangement above briefly described is disclosed in detail, the numerals 1 and 2 designate suitable brackets which are secured in any suitable way to the rear end of the tractor platform P. Both brackets as shown, could of course, be duplicates of one another. However, the last named bracket 2 includes an angular horizontal portion 3 which is equipped with spaced upstanding integral parts 4, between which a bevelled gear 5 is disposed, the latter serving a purpose to be hereinafter set forth. It is obvious that these brackets constitute bearings for a rotatable shaft 6, the latter being equipped with screw-threads between the brackets as indicated at 7 thus enabling the shaft to be conveniently termed a feed-screw. Here, it is to be pointed out that the usual pivoted draw-bar or hitching device B of the tractor extends at right angles to the feed-screw and is connected with the latter through the medium of what may be termed a travelling block 8 which moves horizontally along the screw-threaded portion of the shaft when the latter is rotated. This leads me to say that any suitable means, such for instance as a sprocket wheel 9 driven by a chain 10 and larger sprocket wheel 11 on the drive wheel W, may be employed for imparting rotation to the feed-screw. It is of course understood that any other suitable means may be employed for accomplishing this end. Referring now to the left-hand end of the last named element, it will be seen that bevelled gears 12 and 13 are loosely mounted therein between the upstanding portions 4 of the bracket 2. These gears mesh with the aforesaid gear 5 and gear 12 serves to rotate the shaft in one direction while the remaining gear serves to rotate it in an opposite direction, it being obvious that this result is brought about by employment of the gear 5. It has been before indicated that these gears 12 and 13 are loosely mounted on the shaft. It is therefore necessary to provide suitable means for coupling them with the latter for rotation therewith. By preference, I make use of a clutch 14 of any suitable form, the same being keyed or otherwise fixed on the shaft and being slidable into engagement with the desired gears 12 and 13 for connecting the latter to the shaft for rotation with said shaft. In order to actuate the clutch, I employ a hand-lever 15, the same being fulcrumed between its ends on the rear end of the tractor platform as indicated at 16 and carrying a horizontal bar or link 17 which is connected with a clutch operating fork 18, the latter being pivoted intermediate its ends on the horizontal bar or arm 19 rigidly secured to the depending part of the bracket 2. With this construction, it is obvious that by grasping the lever and throwing it toward the right or the left, the clutch operating fork will be rocked about its pivot in such a way as to impart a sliding movement to the clutch 14, thus engaging the latter with the desired gear according to the direction of movement of the lever.

As already intimated, the invention in addition to embodying the parts so far described, includes novel means for automatically changing the direction of rotation of the feed-screw and the direction of movement of the draw-bar and travelling block when the last named parts have moved a predetermined distance to the right. In carrying out this part of the invention, I make use of a substantially L-shaped trip 20, the same being detachably pivotally connected to the rear end of the tractor platform at the juncture of its long and short arms as indicated at 21. On the free end of the long arm, is a nose 22 and this is designed to engage a lateral pin 23 on the hand lever 15 to hold the latter in the operative position disclosed in Fig. 2. A flat spring or the like 24 is employed for supporting the long arm of the trip to position it for engagement with the pin 23 when the lever 15 is pulled toward the right for engagement with the trip. A careful examination of the part of the device now under consideration will disclose the fact that the depending part of the trip is received between spaced lugs on an adjustable stop 24ª rigidly secured to a sliding shifter rod 25 carried by the brackets 1 and 2. It is obvious that when the traveling block 8 moves toward the right-hand side of the tractor and comes into engagement with the stop, it imparts a sliding movement to the stop and shifter rod, thus rocking the trip about its pivot and against the tension of the spring in such a way as to disengage the nose 22 from the pin 23. In so doing, the coil-spring 26 which is connected with the rod 17 and bracket 2, serves to rock the operating lever about its pivot and in turn shift the clutch to engage the gear previously uncoupled from the shaft. It is yet to be pointed out that a second stop 27 is secured on the rod 25 and this stop includes a depending portion 27ª with which the traveling block 8 is engageable. The lower forked end 28 of the hand-lever is pivotally connected to this stop. It is obvious that with this construction, when the block 8 returns to the approximate center of the shaft or feed-screw as it has been called, it strikes the part 27ª and slides the shifter rod 25 in such a way as to return the hand-lever to the true vertical neutral position disclosed in Fig. 1, holding it in this position against action of the spring 26.

In operation, it will be seen that as the tractor reaches the end of a field and it becomes necessary to turn the same to go back over the field in a reverse direction, the operator on the tractor simply grasps the operating lever 15 and moves it to the inclined position disclosed in Fig. 2. In so doing, the pin 23 rides over the nose 22 and engages behind the shoulder thereon. The trip 20 then serves to hold the lever in this position. The lever being in this position serves to move the clutch 14 in such a way as to engage it with the gear 13 and revolve the shaft in a forward direction. This being the case, the draw-bar and traveling block begin to move horizontally along the feed-screw from left to right until they come into engagement with the stop 24ᵃ and, as before stated, when this happens, the trip is automatically disengaged from the operating lever and the latter under the influence of the spring 26 is moved to and held in an inclined position opposite to that described and shown. When this happens, the clutch is disengaged from the gear 13 and is engaged with the remaining gear and couples the latter with the shaft 6, causing the shaft to rotate in an opposite direction and returning the draw-bar and traveling block to the position disclosed in Fig. 1. As the block 8 engages the depending part 27ᵃ of the stop 27, it moves the operating lever to the truly vertical neutral position here disclosed and holds it in such position against the action of the spring as before described. Such movement of the draw-bar will serve to cause the trailer (not shown), to accurately follow in the tracks of the tractor thus preventing the trailer from overrunning the planted hills as ordinarily occurs.

A careful consideration of the foregoing description taken in connection with the accompanying drawings will be found sufficient to enable persons skilled in the art to which the invention relates to obtain a clear understanding of the same. In view of this, a more lengthy and detailed description is deemed unnecessary.

In all probability, the construction and arrangement herein shown and described will be found advantageous and it is selected as the preferred embodiment of the invention. However, slight minor changes in shape and size coming within the scope of the subjoined claims may be resorted to as is understood.

I claim:

1. A device of the class described comprising a rotary shaft designed to be mounted on the rear end of a lead vehicle, a hitching device connected to and horizontally movable on said shaft, means on said shaft for rotating it in either a forward or rearward direction, a control lever for said means, and other means for automatically actuating said lever when the aforesaid device has moved a predetermined distance on the shaft and becomes engaged with said other means.

2. A device of the class described comprising a feed-screw to be rotatably mounted on the rear end of a lead vehicle, a block movable on said screw, a hitching device connected to said block, gearing on the screw for rotating in a forward or rearward direction, a clutch carried by the latter for coupling the gears to the same, a clutch operating lever, and means associated with the lever and said block for automatically controlling the former when the latter has moved a predetermined distance in either direction.

3. A device of the class described comprising a screw-shaft adapted to be rotatably mounted on the rear end of a lead vehicle, gears loosely mounted on said shaft, means associated with said gears for rotating them in opposite direction, a hitching device connected to and movable along said shaft, a clutch fixed on the latter for coupling the desired gear thereto for rotation therewith, a hand-lever, means for holding the latter in operative position, said means being released by said hitching device when the latter has moved a predetermined distance, a connection between said lever and clutch, and a spring for pulling said lever in a direction to change the position of the same for operating the clutch and rotating the shaft in an opposite direction.

4. A device of the class described comprising brackets including bearings for connection to the rear end of a tractor, a shaft journaled in said bearings, a portion of said shaft being screw-threaded, gearing associated with the shaft and one of said brackets for rotating the shaft in a forward or rearward direction, a clutch fixed on said shaft for rendering said gearing effective, a hand-lever fulcrumed on the tractor, a connection between the lever and clutch for operating the latter, a block movable along the screw-threaded portion of said shaft, a trip for holding the lever in one of its effective positions, and means for disengaging said trip from said lever, being operated when the aforesaid block has moved a predetermined distance and becomes engaged with said means.

5. A device of the class described comprising a feed-screw designed to be rotatably mounted on the rear end of a lead vehicle, gearing loosely mounted on said screw for rotating the same in opposite directions, a clutch for coupling the desired gear with the screw, an operating lever, a connection between the lever and said clutch, a stop on the lower end of said lever, and a hitching device horizontally movable along said screw and normally engaging said stop for holding said lever in a neutral position, and a spring connected with said connection for engaging said clutch with one of said gears.

6. A device of the class described comprising a screw-threaded shaft designed to be rotatably supported on the rear portion of a lead vehicle, means on said shaft for rotating it in opposite directions, a clutch for rendering said means effective and ineffective, operating means for said clutch, a trip designed to be pivotally mounted on the aforesaid vehicle, being engageable with said operating means to hold the latter in one of its effective positions, and a hitching device connected to and horizontally movable along said shaft, serving to operate said trip when it has moved a predetermined distance in a direction toward the latter.

7. A device of the class described comprising a feed-screw designed to be rotatably supported on the rear portion of a tractor, means associated with said screw for changing the direction of rotation thereof, an operating lever for controlling said means, a slidably mounted rod, said lever being connected at its lower end to said rod, a stop on said rod, and a pivotally mounted trip device co-operative with said stop and lever for holding the latter in one of its operative positions, and a hitching device horizontally movable along said screw and engageable with said stop for disengaging said trip from said lever.

8. A device of the class described comprising brackets for connection to the rear end of a tractor, said brackets including bearings, a shaft rotatably mounted in said bearings and including a screw-threaded portion, a hitching device connected to and horizontally movable along the screw-threaded portion of said shaft, a shifter rod carried by said brackets, a stop on said rod including spaced ears, a substantially L-shaped trip lever designed for pivotal connection to the tractor, the depending portion thereof being loosely received between said ears, gearing for rotating the shaft in opposite directions, a clutch for coupling the desired gear to said shaft, and an operating lever for the clutch, said trip being connected with said operating lever and being disengaged therefrom when the aforesaid hitching device moves along the shaft and engages the aforesaid stop.

9. A device of the class described comprising a pair of brackets designed for connection to the rear end of a tractor, said brackets including bearings, a shaft journaled in said bearings and having a screw-threaded portion, gears loosely mounted on said shaft, a gear carried by one of said brackets and co-operative with said gears for causing them to rotate the shaft in opposite directions, a clutch on said shaft for coupling the desired gear with the shaft, a hand-lever, a connection between the hand-lever and clutch, a spring connected to said connection, a trip for co-operation with said lever for holding it in one of its operative positions, a stop co-operative with said trip, and a traveling hitching device movable along said shaft and engageable with said stop for disengaging the trip from said lever, as and for the purpose described.

In testimony whereof I have hereunto set my hand.

ERNEST G. WROUGHTON.